US007740299B2

(12) United States Patent
Reischer et al.

(10) Patent No.: US 7,740,299 B2
(45) Date of Patent: Jun. 22, 2010

(54) CENTRAL CONSOLE FOR A VEHICLE

(75) Inventors: Franz Reischer, Unterdietfurt (DE);
Michael Windl, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 689 days.

(21) Appl. No.: 11/521,065

(22) Filed: Sep. 14, 2006

(65) Prior Publication Data
US 2007/0108785 A1 May 17, 2007

(30) Foreign Application Priority Data
Sep. 16, 2005 (DE) ........................ 10 2005 044 436

(51) Int. Cl.
*B60R 7/00* (2006.01)
(52) U.S. Cl. ..................... 296/24.34; 296/153; 224/275
(58) Field of Classification Search ............. 296/24.34, 296/37.8, 153, 37.15, 37.1, 37.6, 37.16, 37.5; 224/275, 929, 400, 401
See application file for complete search history.

(56) References Cited
U.S. PATENT DOCUMENTS

| 6,616,205 B2 | 9/2003 | Bruhnke et al. |
| 2003/0047955 A1 | 3/2003 | Bruhnke et al. |
| 2004/0080173 A1 * | 4/2004 | Niwa et al. ............... 296/24.34 |
| 2004/0201238 A1 * | 10/2004 | Griggs et al. ............. 296/24.34 |
| 2004/0251746 A1 * | 12/2004 | Ichimaru et al. ............ 307/116 |
| 2005/0133507 A1 | 6/2005 | Tanaka |
| 2005/0248170 A1 * | 11/2005 | Kawamoto et al. ........ 296/24.34 |

FOREIGN PATENT DOCUMENTS

| DE | 10032661 B4 | 4/2002 |
| DE | 10032684 A1 | 5/2002 |
| DE | 10247453 A1 | 4/2004 |
| DE | 202004001804 U1 | 4/2004 |
| EP | 1485374 A | 12/2004 |
| JP | 09310309 A | 11/1996 |

OTHER PUBLICATIONS

European Search Report EP 06018676, dated Dec. 11, 2006.

* cited by examiner

*Primary Examiner*—Patricia L Engle
*Assistant Examiner*—SunSurraye Westbrook
(74) *Attorney, Agent, or Firm*—Wolf, Greenfield & Sacks, P.C.

(57) ABSTRACT

A lid is formed with a domed underside that faces the internal space of a vehicle console. The console includes an operating mechanism disposed within an end face of the console basic body and that lies in a plane perpendicular to the pivot axis underneath the lid. The operating mechanism can be used universally both for individual lids as well as for lid wings. The operating mechanism requires as little usable space as possible to accommodate the operating mechanism.

17 Claims, 4 Drawing Sheets

CENTRAL CONSOLE FOR A VEHICLE

CROSS REFERENCE TO RELATED APPLICATION

Foreign priority benefits are claimed under 35 U.S.C. §119 (a)-(d) or 35 U.S.C. §365(b) of German Application No. DE 10 2005 044 436.9, filed Sep. 16, 2005, which is hereby incorporated by reference in its entirety.

BACKGROUND OF THE INVENTION

1. Field

The present invention relates to a console for a vehicle, and more particularly to a central console with a pivotable lid.

2. Discussion of Related Art

Consoles for storing personal articles in vehicles are generally known in the art, as are consoles positioned centrally between seats of the driver and forward passenger. Many of such central consoles have a lid that is pivotable in relation to a basic body of the console. The basic body can be shaped as a longitudinally extended box, block or shell-like structure that lies along a substantially horizontal axis extending along the transverse or longitudinal direction of the vehicle. Consoles may also have a lid that is divided and that can be pivoted in a wing-like manner (known as butterfly lids) between an open position and a closed position about two axes that are parallel to one another.

The internal space of the console can be used to hold drink cans, telephone receivers, mobile phone mountings, CD cases or other such objects. The lid or lid wings of the console may be opened to provide access to the internal space so that a person can place articles into or remove objects therefrom. The basic body of the console may also be fitted with appropriate mountings or fixtures for holding such objects securely in place. The upper side of the lid or lid wings can also be padded and may serve, in the closed position, as an armrest for the driver or passenger of the vehicle.

The lid and basic body of the console can be connected by an operating mechanism that consists of a lever connected to a spring or electric motor drive. The console may also have an unlatching element, such as a pushbutton or a pressure area, which co-operate with latching elements, such as hooks, latches or detents. Silicone brakes, friction brakes, and gas springs may be provided as braking elements in such mechanisms.

There is a need, however, for operating mechanisms that comprise fewer numbers of individual parts and/or that require less space to be accommodated by the console. There is also a need for a console with an operating mechanism that requires as little usable space as possible, particularly within the internal space of the console. It is also desirable for the internal space to be able to accommodate the operating mechanism with few discontinuities. Additionally, it is desirable for the individual elements of the operating mechanism to be accommodated as invisibly as possible within the console, so as not to detract from the aesthetic appearance.

Known consoles have attempted to address those needs unsuccessfully. The attempts have led in practice to the most varied constructions and in particular to compromised solutions. By way of example, one of these compromised solutions consists of placing the operating mechanism directly in the lid of the central console. In such a configuration, the usable space on the under side of the lid is restricted.

SUMMARY

According to one aspect of the invention, a console for a vehicle is disclosed. The console comprises a basic body extending in a longitudinal direction of the vehicle and having an internal space to hold objects, a lid that at least partially forms an upper side of the basic body and that is pivotable between a closed and an open position about a pivot axis that extends substantially parallel to the longitudinal direction. When in the closed position, the lid forms at least a part of an armrest and when in the open position the lid allows access to the internal space of the basic body. The console also comprises an operating mechanism for the lid that has a drive, a latching and unlatching element, and a braking element. An underside of the lid is domed in relation to the internal space. The operating mechanism is disposed underneath the lid within an end face of the basic body that lies in a plane perpendicular to the pivot axis.

According to another aspect of the invention, a console for a vehicle is disclosed. The console comprises a basic body that defines an internal space and an operating mechanism storage compartment in an end face of the basic body. A lid is pivotably mounted to the basic body. The lid is movable, about a pivot axis, between an open position to allow access to the internal space and a closed position to prevent access to the internal space. An operating mechanism provides controlled movement of the lid between the closed and open positions. The operating mechanism is positioned within the storage compartment and is connected to the lid.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION OF THE DRAWINGS

Figure 1:
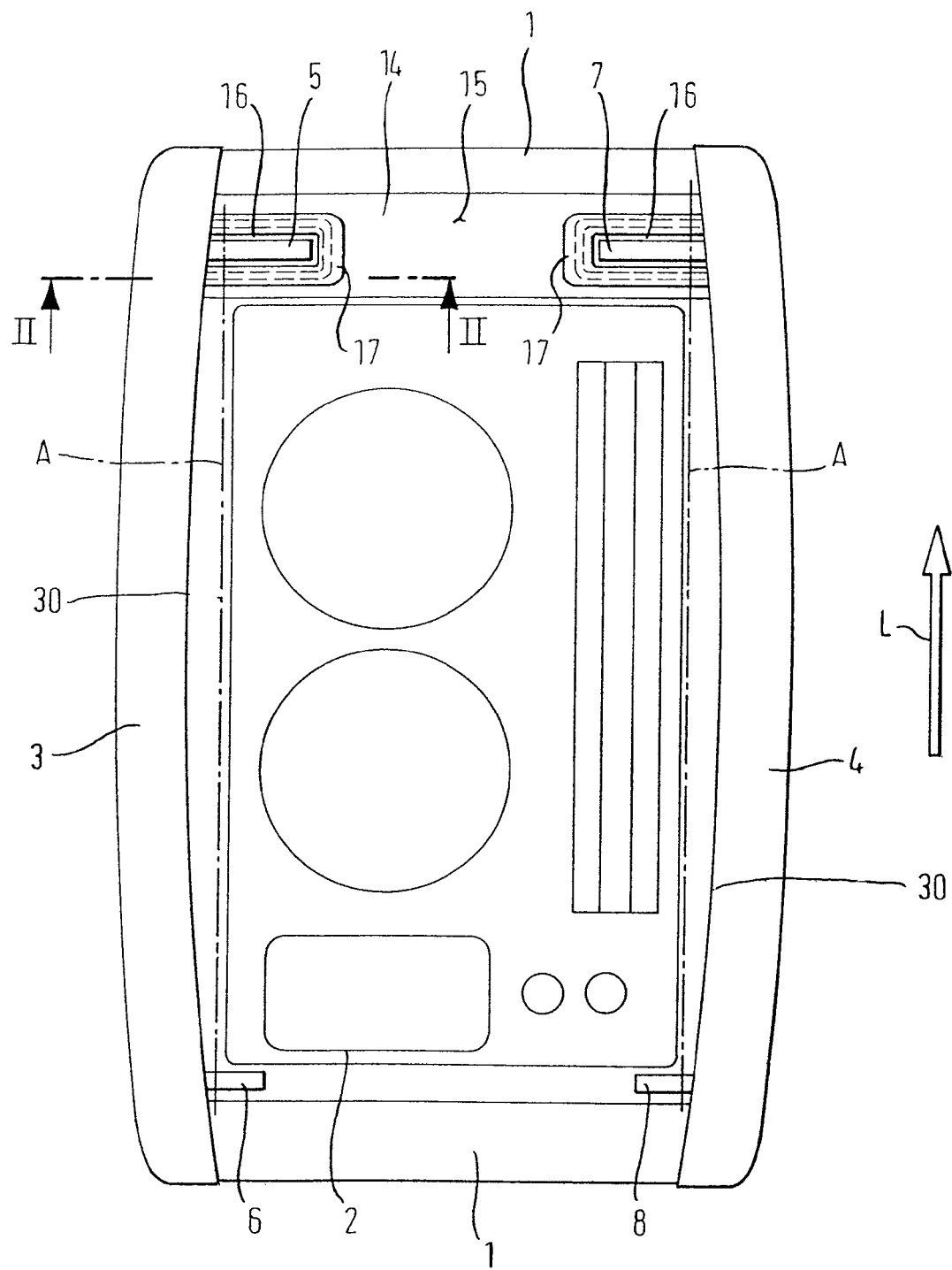
FIG. 1 shows a top view of an embodiment of central console with a butterfly lid, in which the lid wings are pivoted into the open position.

Broadly speaking, aspects of the invention relate to a console for a vehicle that is configured to hold personal articles within an internal space of a basic body of the console. The console may be positioned between the driver and passenger seats of vehicle and may have one or more operating mechanisms that are stored within end face(s) of the basic body. One or more lids may be pivotably mounted to the basic body, such that the lid(s) can move between open and closed positions. The operating mechanism(s) may provide for controlled movement of the lid between the closed and open positions.

According to an illustrative embodiment, the configuration of the central console may be dictated by the hinge areas of the lid or lid wings which, for design reasons in some vehicles, cannot be disposed at arbitrary positions.

According to an illustrative embodiment, a central console is configured to have a large, usable internal space, particularly in view of the overall size of the console. The console includes an operating mechanism that helps control the opening and closing of a lid that covers an internal space of the console. The operating mechanism is configured to be used with a wide variety of lid constructions and lid shapes, and can be used universally with both single lids and lid wings. According to some illustrative embodiments, the operating mechanism requires minimal space to be accommodated in the console.

According to an illustrative embodiment, the lid has a central convex underside, in relation to the internal space. The operating mechanism is disposed underneath the lid within an end face of the basic body that lies in a plane that is substantially orthogonal to the pivot axis between the lid and basic body. However, it is to be appreciated that in other embodiments, the operating mechanism may be positioned differently, as aspects of the invention are not limited in this respect.

According to an illustrative embodiment, the operating mechanism is disposed within an end face of the basic body that lies transverse to the longitudinal direction of the console (i.e., the direction that extends from fore to aft of the vehicle). Due to such a configuration, only a slight amount of room is lost from the internal space to accommodate the operating mechanism. This may be especially advantageous for consol constructions with two lid wings, which may require an operating mechanism for each lid.

According to some illustrative embodiments, the lid of the console is domed, at least on its underside, in a convex manner across an area that corresponds to the internal space of the basic body.

According to some illustrative embodiments, the pivot axis of the lid lies outside of an outline of the domed area of the lid on the side facing the internal space. This can provide an enlargement of the usable internal space, especially in relation to the height of the internal space. This configuration may also contribute to an ergonomic upper side of the lid or lid wings. Relocation of the pivot axis outside of the lid's outline, in such embodiments, can also provide for a considerable degree of structural freedom in the lid. It is to be appreciated, however, that the lid may also be domed, at least, on its underside in a concave manner, or may not be domed at all, as aspects of the present invention are not limited in this respect.

According to another illustrative embodiment, the lid or lid wing may have, on an underside, two bearing projections disposed at a distance from one another in the longitudinal direction. The axes of the bearing projections may each lie within the pivot axis and may be configured to engage bearing bolts to provide pivots between the lid and basic body. The bearing projections may also establish the connection to an operating mechanism disposed within the end face of the base body. In one illustrative embodiment of the invention, at least one of the bearing projections is formed as a lever plate disposed in the underside of the respective lid or lid wing. The lever plate may protrude substantially perpendicular from the lid. It is to be appreciated, however, that lever plates may be shaped in any suitable manner and are not required to extend perpendicularly. A particularly advantageous configuration may exist, however, if the lever plates are shaped in the manner of a quarter circle sector with a hole for the respective bearing bolt within its central angle.

A connection between a lid and the operating mechanism may be provided by a lever plate. For instance, the bearing point within a circumference of a lever plate may provide a connection to the operating mechanism, such as one end of a connecting rod. This connecting rod may be a part of the operating mechanism and may be accommodated within the end face of the basic body without requiring a large amount of space.

The connecting rod may be operated in a variety of manners. The connecting rod may, for example, cooperate with a lever system to move the lid or lid wings between an open and a closed position. The connecting rod may, however, also be supported on a guide rod and may be fitted at its bottom end with a drive, as may be provided by a compression spring. Other configurations are also possible, as aspects of the present invention are not limited in this respect.

The drive (e.g., a compression spring) may be disposed in any manner within the end face of the basic body. By way of example, in one embodiment, the compression spring is supported directly on the connecting rod, although other configurations are also possible.

In one illustrative embodiment, the operating mechanism includes a braking element, such as a silicone brake. This silicone brake may be fitted with a toothed wheel through which braking forces may be transmitted. In such an embodiment, the operating mechanism may be fitted with a toothed rack which engages with the toothed wheel of the silicone brake. Still, other embodiments may involve different braking elements, or no braking elements at all, as aspects of the invention are not limited in this respect.

The toothed rack may be disposed in any manner within the end face of the basic body. According to one illustrative embodiment, the toothed rack is disposed parallel to the connecting rod and is linked thereto by way of a push element that protrudes from the toothed rack. Such a configuration may save space within the console and may be adjusted to different opening characteristics.

As discussed herein, embodiments of the lever plate may be shaped like a quarter circle sector disposed on the underside of each lid wing. Embodiments of the lever plate may also carry the bearing point for the end of the connecting rod. However, other configurations are possible, as aspects of the invention are not limited in this respect.

According to one embodiment, the basic body is fitted with insertion slots that receive the lever plates within an upper edge that faces towards the lid wings. The insertion slots lie transverse to the longitudinal direction of the central console and are disposed in within the end faces of the basic body where the operating mechanism is situated. Here, the lever plates may slide downwards into the insertion slots on the upper edge of the basic body when the lids are closed. It is to be appreciated that other configurations are also possible, as the present invention is not limited in this respect.

The latching element and the unlatching element, as described herein, may be formed in a variety of manners, and, in some embodiments, may have pushbuttons, pressure areas or may cooperate with latching disposals of a variety of designs.

Turn now to the figures, and initially FIG. 1 where an embodiment of the present invention is shown. As may be seen from FIG. 1, the central console may comprise a basic body 1 that extends in the longitudinal direction L of the vehicle. The internal space of the console is fitted with mountings 2 for holding various objects.

As discussed herein, a variation of the central console, as shown, may be fitted with a butterfly lid that has two lid wings 3 and 4, each pivotable about a substantially horizontal axis A that lies in the longitudinal direction of the central console. As shown in FIG. 1, each lid wing 3, 4 may include a curved underside 30 which provides the lid with a domed underside in relation to the internal space of the console.

Figure 2A:
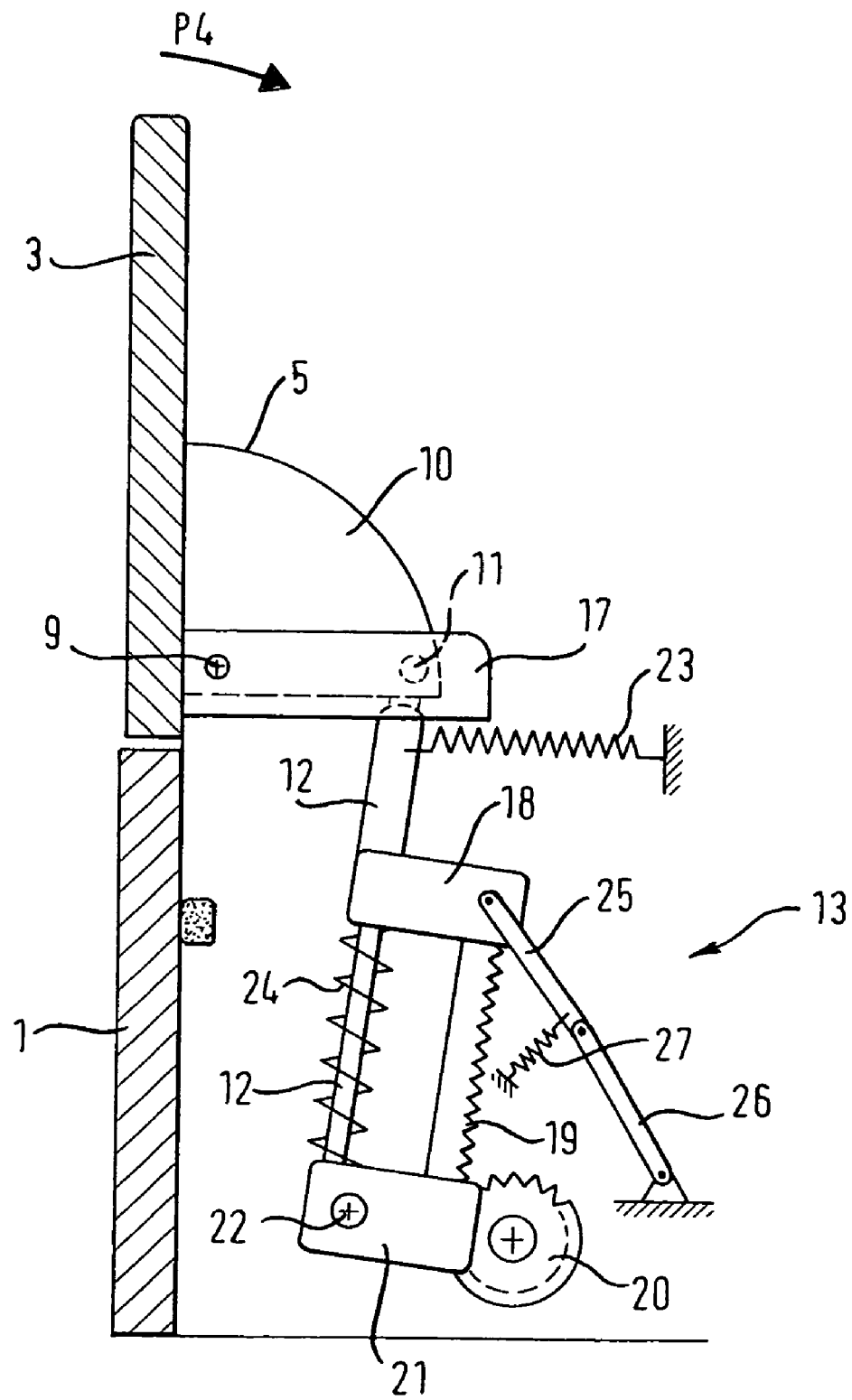
FIG. 2a shows a section in plane II-II of FIG. 1 with a lateral view of the operating mechanism in the open position, as represented in FIG. 1.

According to an illustrative embodiment, axes A of lid wings 3 and 4 are each disposed within the longitudinal sides of the respective lid wing that face away from one another. This results in lid wings 3 and 4 that are hinged in the open position, as shown in FIG. 2a, for the left-hand lid wing 3 of FIG. 1.

As may further be inferred from FIG. 1, each lid wing 3 and 4 may be fitted on an underside (as viewed in the closed position) with two bearing projections 5 and 6 or 7 and 8, respectively, disposed at a distance from one another in the longitudinal direction. The bearing projections may have bearing bolts 9 (cf. FIGS. 2a to 2c) that each lie within a corresponding pivot axis A.

According to one illustrative embodiment, bearing projections 5 and 6 or 7 and 8, respectively, are each disposed at a distance from one another within the end faces of the lid wings, i.e. outside the internal space and mounting 2 for objects within the internal space.

As shown in the embodiment of FIG. 1, each of the bearing projections (5 and 7) may be formed as a lever plate 10 shaped as a quarter circle sector. The lever plate may be disposed on the underside of respective lid or lid wings 3 and 4 and may protrude substantially perpendicular therefrom. The lever plate may have a hole to receive bearing bolt 9 within its central angle.

Figure 2B:
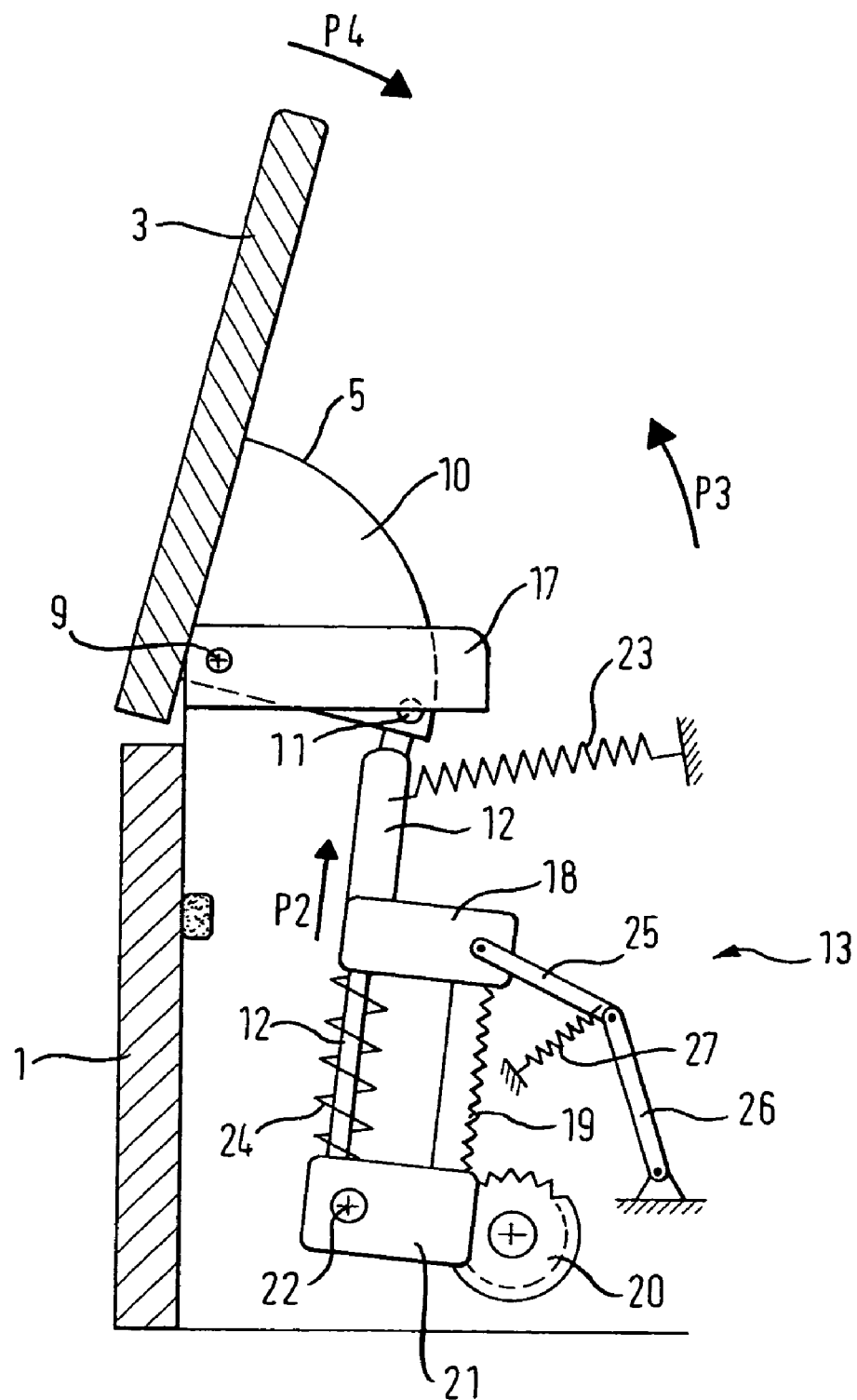
FIG. 2b shows a representation corresponding to FIG. 2a with the operating mechanism in an intermediate position.
Figure 2C:
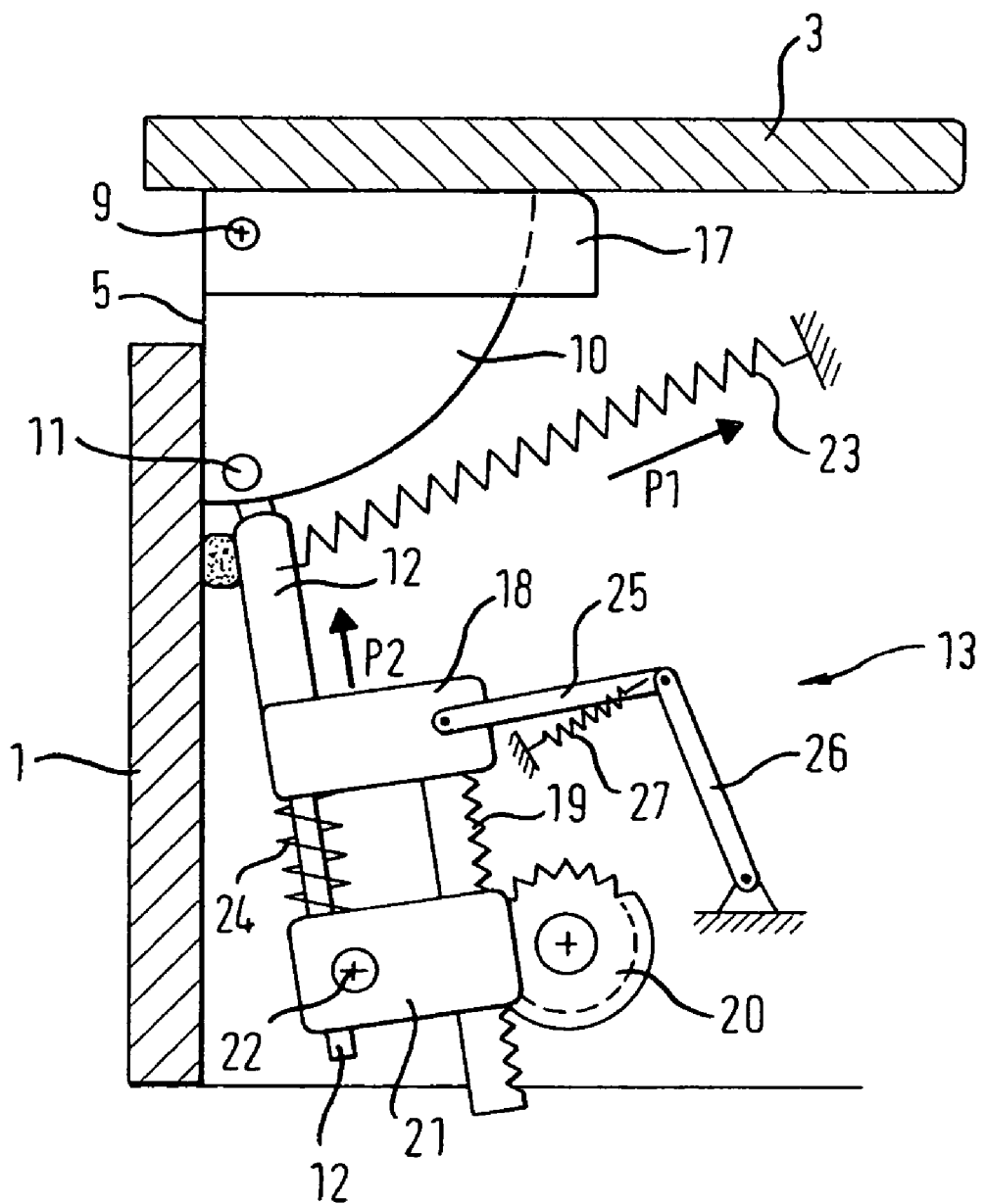
FIG. 2c shows a representation corresponding to FIGS. 2a and 2b in which the lid wing and the operating mechanism are in a closed position.

As can be seen from FIGS. 2a to 2c, lever plate 10 may be fitted within its circumference with a bearing point 11 for one end of a connecting rod 12. The connecting rod 12 may be part of operating mechanism 13, which in FIGS. 2a to 2c is shown in a lateral view in different operating positions. Operating mechanism 13 may be situated in front section 14 of basic body 1, (i.e. within the front end face in the longitudinal direction L of the vehicle in a plane perpendicular to pivot axis A and underneath the lid), as shown in FIGS. 2a to 2c. The front section 14 of the basic body may be closed off towards the top by a wall 15 which has an insertion slot 16 in the area of bearing projection 5 and lever plate 10. The slot may be disposed inside a collar 17 connected to wall 15. Still, other configurations are possible, as aspects of the present invention are not limited in this manner.

The operating mechanism may be configured such that lever plate 10, as shown in FIGS. 2a to 2c, can slide downwards into insertion slot 16 to the right of collar 17 during movement from the open position (FIG. 2a) into the closed position (FIG. 2c). It is to be appreciated that the illustrated operating mechanism is but one possible configuration, as aspects of the invention are not limited by the drawings.

As may be gleaned from FIGS. 2a to 2c, connecting rod 12 of operating mechanism 13 may be permanently connected, at its center with a cross-arm 18, which carries a toothed rack 19 on its free end. The toothed rack may run parallel to connecting rod 12 and may engage with a toothed wheel 20. Toothed wheel 20 may be connected to a silicone brake (not shown), which in some embodiments comprises a braking unit for operating mechanism 13.

The bottom end of connecting rod 12 may be guided in a bearing block 21 that is pivotably supported within limits on basic body 1 by way of axis 22. The bearing block may guide the lower part of connecting rod 12 and toothed rack 19, as is apparent from FIG. 2c.

According to some illustrative embodiments, tension spring 23 is coupled at one end to the top end of connecting rod 12 underneath bearing point 11. The other end of the tension spring may be attached to basic body 1.

According to some embodiments, a compression string 24 may be at the bottom end of connecting rod 12, between cross-arm 18 and bearing block 21. In the illustrated embodiment the compression spring forms the drive for operating mechanism 13, as is described herein. It is to be appreciated that other configurations are also possible.

A first link 25 may be pivotably attached at one end to cross-arm 18, the link being coupled at the other end to a second link 26. The other end of the second link may be pivotably attached to basic body 1. First link 25 and second link 26 form a toggle lever that is loaded in the direction of its dead center position by way of a tension spring 27. In this regard, the toggle lever is configured such that first link 25 and second link 26 are not completely in their dead center position, such that a deflection is possible, as is shown in FIGS. 2b and 2c.

In the normal position, lid wings 3 and 4 of the central console are in the closed position, closing the top of the internal space of basic body 1. This is shown in FIG. 2c by the example of lid wing 3. Lid wing 3 may be locked in this closed position by a latching element (not shown). Once the latching element is released, the tension spring 23 can pull the top part of the connecting rod in the direction of arrow P1 (cf. FIG. 2c) such that the connecting rod 12 can move out of its dead center position between bearing bolt 9 and axis 22.

As soon as the dead center position is left, compression spring 24 may displace cross-arm 18 in the direction of arrow P2 (cf. FIGS. 2b and 2c). This displacement movement in the direction of arrow P2 may be delayed by a braking unit so that the opening movement of the lid(s) is not jerky, but rather smooth and continuous as is indicated by arrow P3 in FIG. 2b. This opening movement can be assisted by tension spring 23.

After completion of the opening movement, lid wing 3 is in the open position shown in FIG. 2a. In this open position, cross-arm 18 is extended completely upwards with the result that, assisted by tension spring 27, first link 25 and second link 26 are almost in their dead center position. In this regard, lid wing 3 is securely held in its open position, and is assisted by compression spring 24 on connecting rod 12.

For the closing procedure, lid wing 3 is moved in the direction of arrow P4 (cf. FIG. 2a). As a result of this movement, lever plate 10 may slide down into insertion slot 16 of collar 17 of basic body 1 and may press connecting rod 12 downwards against the force of compression spring 24. At the same time first link 25 and second link 26 are moved out of their almost dead center position against the resistance of tension spring 27, as is shown in the intermediate position represented in FIG. 2b. Lid wing 3 may then be moved further in the direction of arrow P4 and brought into its closed position, as shown in FIG. 2c. Lid wings may then be held by way of a latching element (not shown) until the next opening procedure.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the sprit and scope of the invention. Accordingly, the descriptions and drawings herein are by way of example only.

What is claimed:

1. A console for a vehicle comprising:
    a basic body extending in a longitudinal direction of the vehicle and having an internal space to hold objects, a lid that at least partially forms an upper side of the basic body and that is pivotable between a closed and an open position about a pivot axis that extends substantially parallel to the longitudinal direction, the lid comprising two bearing projections disposed at a distance from one another in the longitudinal direction and configured to engage with bearing bolts positioned on the pivot axis;
    wherein the bearing projections are each formed as a lever plate shaped as a portion of a circle and disposed on the underside of the lid, the lever plate extending perpendicularly from the lid and having a hole to receive the bearing bolt within a central angle of the lever plate;
    wherein when in the closed position, the lid forms at least a part of an armrest and when in the open position the lid allows access to the internal space of the basic body;
    an operating mechanism for the lid that has a drive; and
    wherein an underside of the lid is domed in relation to the internal space, the operating mechanism being disposed underneath the lid within an end face of the basic body that lies in a plane perpendicular to the pivot axis.

2. The console according to claim 1, wherein a perimeter of the domed underside of the lid defines a lid outline, wherein the pivot axis lies outside of the lid outline.

3. The console according to claim 1, wherein the domed underside is concave in relation to the internal space.

4. The console according to claim 1, wherein the lid comprises two lid wings that each extend along the longitudinal direction and that are each pivotable about a substantially horizontal axis that lies substantially parallel to the longitudinal direction.

5. The console according to claim 4, wherein the pivot axis of each of the lid wings lies within longitudinal sides of the lid wings that face away from one another.

6. The console according to claim 4, wherein the bearing projections are each disposed at end faces of the lid wings.

7. The console according to claim 1, wherein the lever plate has a bearing point to connect to one end of a connecting rod of the operating mechanism.

8. The console according to claim 7, wherein the connecting rod cooperates with a lever system that moves the lid between the open and closed positions.

9. The console according to claim 8, wherein the drive is a compression spring supported on the connecting rod.

10. The console according to claim 9, wherein the lever system includes a toothed rack that engages with a toothed wheel.

11. The console according to claim 10, wherein the toothed rack runs parallel to the connecting rod.

12. The console according to claim 11, wherein the toothed rack is connected to the connecting rod.

13. The console according to claim 1, wherein the basic body has insertion slots to receive the lever plates.

14. The console according to claim 13, wherein the insertion slots run transverse to the longitudinal direction and are disposed in end faces of the basic body.

15. A console for a vehicle comprising:
    a basic body that defines an internal space and an operating mechanism storage compartment in an end face of the basic body;
    a lid pivotably mounted to the basic body, the lid movable, about a pivot axis, between an open position to allow access to the internal space and a closed position to prevent access to the internal space;
    an operating mechanism that provides controlled movement of the lid between the closed and open positions, the operating mechanism positioned within the storage compartment and connected to the lid; and
    a wall positioned on a top portion of the operating mechanism storage compartment to obscure at least portions of the operating mechanism from view when the lid is in the open position, wherein a slot is positioned in the wall to accommodate a connection between the lid and the operating mechanism;
    wherein the lid comprises a lever plate that provides pivotable connections to the operating mechanism and the basic body, the lever plate configured such that the operating mechanism remains substantially in the storage compartment when the lid is in the open position.

16. The console according to claim 15, wherein the lid has a concave shaped underside facing the internal space when the lid is in the closed position.

17. The console according to claim 15, wherein the pivot axis lies outside of a perimeter of the concave shaped underside.

* * * * *